(12) United States Patent
Cosenza et al.

(10) Patent No.: US 6,808,348 B1
(45) Date of Patent: Oct. 26, 2004

(54) LOCK NUT MEMBER

(75) Inventors: Frank J. Cosenza, Santa Barbara, CA (US); Luke L. Haylock, Culver City, CA (US)

(73) Assignee: Alcon Global Fasteners, Inc., Torrance, CA (US)

( * ) Notice: Subject to any disclaimer, the term of this patent is extended or adjusted under 35 U.S.C. 154(b) by 0 days.

(21) Appl. No.: 10/410,078

(22) Filed: Apr. 9, 2003

(51) Int. Cl.[7] .......................... F16B 39/22; F16B 39/284

(52) U.S. Cl. ...................... 411/280; 411/324; 411/937.1

(58) Field of Search ................................ 411/280, 308, 411/324, 433, 937.1

(56) References Cited

U.S. PATENT DOCUMENTS

| | | | |
|---|---|---|---|
| 3,687,182 A | * 8/1972 | Grimm | ................ 411/937.1 X |
| 3,702,628 A | 11/1972 | Cosenza | |
| 4,890,965 A | * 1/1990 | Dietlein | ...................... 411/280 |
| 4,990,043 A | 2/1991 | Hafeli et al. | |
| 5,088,868 A | 2/1992 | Cosenza et al. | |
| 5,827,027 A | * 10/1998 | Wakabayashi | .......... 411/280 X |

* cited by examiner

*Primary Examiner*—Neill Wilson
(74) *Attorney, Agent, or Firm*—David P. Maivald (57) ABSTRACT

A threaded locking beam nut having a plurality of locking beams configured such that the inside edge surface of each locking beam has a radially inwardly angled surface thereby forming substantially a V-shaped channel between adjacent beams.

12 Claims, 9 Drawing Sheets

LOCK NUT MEMBER

BACKGROUND OF THE INVENTION

The present invention relates to lock nuts having a plurality of resilient locking segments which deflect in a manner similar to that of a beam, and, more particularly, to a construction of the locking segments wherein the internal threads at the junction of adjacent beams are angled radially inward, thereby forming a V-shaped internal slot. The present invention also is directed to a new method of manufacturing the lock nut.

The present invention is an improvement in the design of a locking beam nut described and disclosed in U.S. Pat. No. 5,088,868. The locking beam nut of the '868 patent discloses a design having a plurality of circumferentially-spaced resilient locking beams that were specifically configured to prevent any accumulated debris from preventing a desired deflection of the beams. The beams project from a substantially rigid body and have a circular opening extending completely through the body and the locking beams. The beams all taper inwardly, such that the circular opening they define have a uniformly-decreasing diameter. Continuous threads of substantially uniform depth are defined in the aligned openings, for receiving an externally threaded member, wherein the locking beams resiliently deflect outwardly to lock the member in place. The confronting sidewalls of adjacent beams are configured to diverge outwardly from each other, such that any debris located between them could not inhibit inward deflection of the beams upon removal of the externally threaded member.

Although the design described in the '868 patent was an improvement upon prevailing locking beam nut designs, all previous designs for slotted beam nuts possess beams that are curved which, through natural stiffening of a curved design of a beam, have a tendency to concentrate loads and cause stress risers at the attachment points of the beams to the body of the nut. Consequently, low reuse cycles and rapid deterioration of the prevailing torque is undesirable. Another problem with previous beam nut designs is that typically the nut, which is utilized with a bolt having a holdout spring, compresses the spring when rotated in the internal threads of the beam nut. Periodically, the flexible holdout spring can become wedged and locked in two axial slots located on the inside diameter of the beam nut. Additional problems of prior designs are that the locking torque was insufficient and manufacturing and fabrication operations were extremely high due to the slotting, tapping and subsequent retapping operations necessary to remove burrs. Consequently, an improved beam nut design is necessary to address these and other problems associated with prior beam nut configurations.

SUMMARY OF THE INVENTION

The present invention provides a beam nut construction and arrangement which addresses the problems associated with prior beam nut configurations. The invention is embodied in a locking beam nut having a plurality of circumferentially-spaced resilient locking beams that are specifically configured to improve the performance and quality of the nut, and at the same time reduce manufacturing fabrication costs. The nut has unique features that provide substantially higher reuse cycles without rapid deterioration of the prevailing torque. The design allows for high reuse by lowering and reducing stress concentrations of a deflecting beam. The beam nut design of the present invention utilizes flat beams on the exterior portion of each beam, and a unique inside surface to substantially distribute the bending load through the length much more evenly, thus reducing stress concentrations. This is accomplished by incorporating an inside surface configuration wherein the internal threads at the junction of adjacent slotted beams are angled radially inwardly. This is in stark contrast to previous designs where the threads were 90° to the slotted beams. The angled radially inwardly inside beam configuration provides for a substantially "V-shaped" internal slot length that travels the full length of the beam, and, in certain applications can continue through the entire length of the nut. The V-shaped internal slot has the capability to improve cycle life or reusability performance due to the fact that the cantilevered beam now approaches the characteristics of a true rectangular beam.

The internal V-shaped slot also eliminates the probability of the holdout spring on the bolt from becoming wedged into the slot by supplying an angled slope wide enough to act as a detent and not capture the holdout spring. A secondary locking system is added to provide additional prevailing torque and is accomplished during installation and removal of the beam nut wherein the holdout spring ratchets into each beam V-shaped slot whereby the additional friction contributes to increased prevailing torque.

A significant manufacturing improvement is realized with the internal V-shaped slot by streamlining and removing a series of costly operations in producing the beam nut previously required. The invention is produced by utilizing a heading procedure to form V-shaped slots from the exterior surface of a nut blank facing inward toward an external flat beam surface. Next a tap drilling operation commences wherein the tap drill removes the core and the apex of the external V form thereby forming the individual beams. The internal V-shaped slots are then formed by a broaching procedure and the nut is then threaded to complete the manufacturing process. This is in stark contrast to prior systems which required the tapping of the internal threads, then a slotting operation to form individual beams, which resulted in burrs forming in the internal threads of the nut. A subsequent retapping operation was necessary to remove the burrs. The method for manufacturing the present invention eliminates the beam slotting operation, double tapping and the deburring operations.

Other features and advantages of the present invention will be appreciated from the following description of an exemplary embodiment, taken in conjunction with the accompanying drawings, which illustrate, by way of example, the principles of the invention.

DETAILED DESCRIPTION OF THE INVENTION

Figure 1:
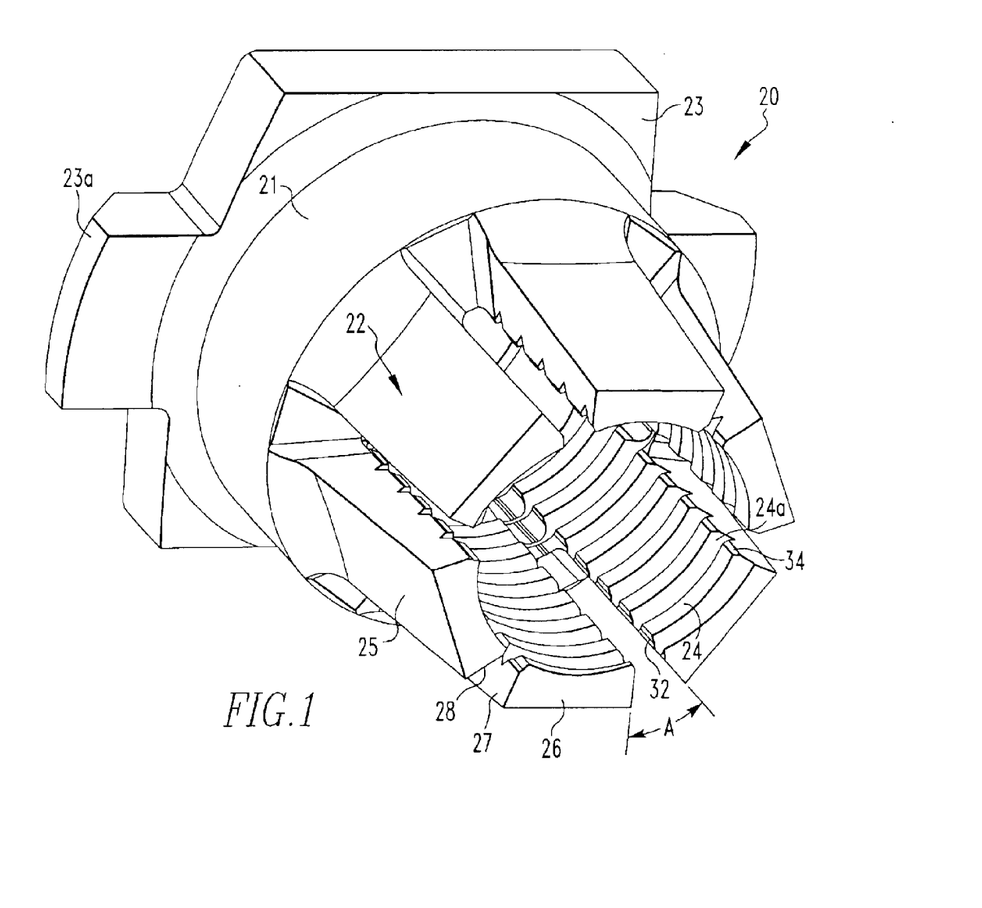
FIG. 1 is a perspective view of the locking beam nut of the present invention.

The present invention is an improvement in the construction and operation of known locking beam nuts or lock nuts and, in particular, of the lock nut shown and described in U.S. Pat. No. 5,088,868. Lock nuts of this kind are generally of a one-piece construction. As shown in FIG. 1, each lock nut 20 has a non-deflectable or rigid body portion 21 and a plurality of locking segments or beams 22. Each beam is formed integrally with the body portion 21 and extends axially therefrom. The body portion 21 has an internal axial opening extending completely through it. The opening is threaded so as to receive the external threads of a bolt or like part or fastener. The body portion 21 may also have a plurality of flat wrenching surfaces (not shown) along its external surface. Lock nut 20 also includes a flange 23 adjacent the body portion 21 opposite from beams 22. Flange 23 may have a plurality of positioners 23a which are used for alignment purposes in a cassette or the like.

The lock nut 20 is depicted to include six locking beams 22. It should be understood, however, that the invention is not limited to any specific number of locking beams. Each locking beam 22 has an inner surface 24 and an opposite outer surface 25, which is preferably flat. A top surface 26, which is typically flat, extends between the inner and outer surfaces 24 and 25 and defines a free end of the beam. The plurality of locking beams 22 are arranged circumferentially at one end of the body portion 21 such that the inner surfaces 24 define a circular opening that is threaded. The threads 24a in the aligned openings of the body portion and the beams extend along the entire axial length of the aligned openings, and have a substantially uniform depth around their entire circumference.

Each locking beam 22 also has a first sidewall 27 and a second sidewall 28. Each of these sidewalls extends between the body portion 21 and the beam's inner, outer and top surfaces 24, 25 and 26, respectively. Preferably, both of the sidewalls are smooth or flat.

The sidewalls 27 and 28 of each beam can be configured to be substantially perpendicular to the beam's outer surface 25. The confronting sidewalls of adjacent beams therefore diverge from each other, with increasing radial distance, forming an angle A. The sidewalls 27 and 28 of each beam can also be configured to form a slightly acute angle with the outer surface 25. Similarly, the sidewalls 27 and 28 of each beam can be configured to form a slightly obtuse angle with the outer surface 25. Each of these three configurations performs a specific function of cleaning debris, as discussed in detail in U.S. Pat. No. 5,088,868.

Figure 2:
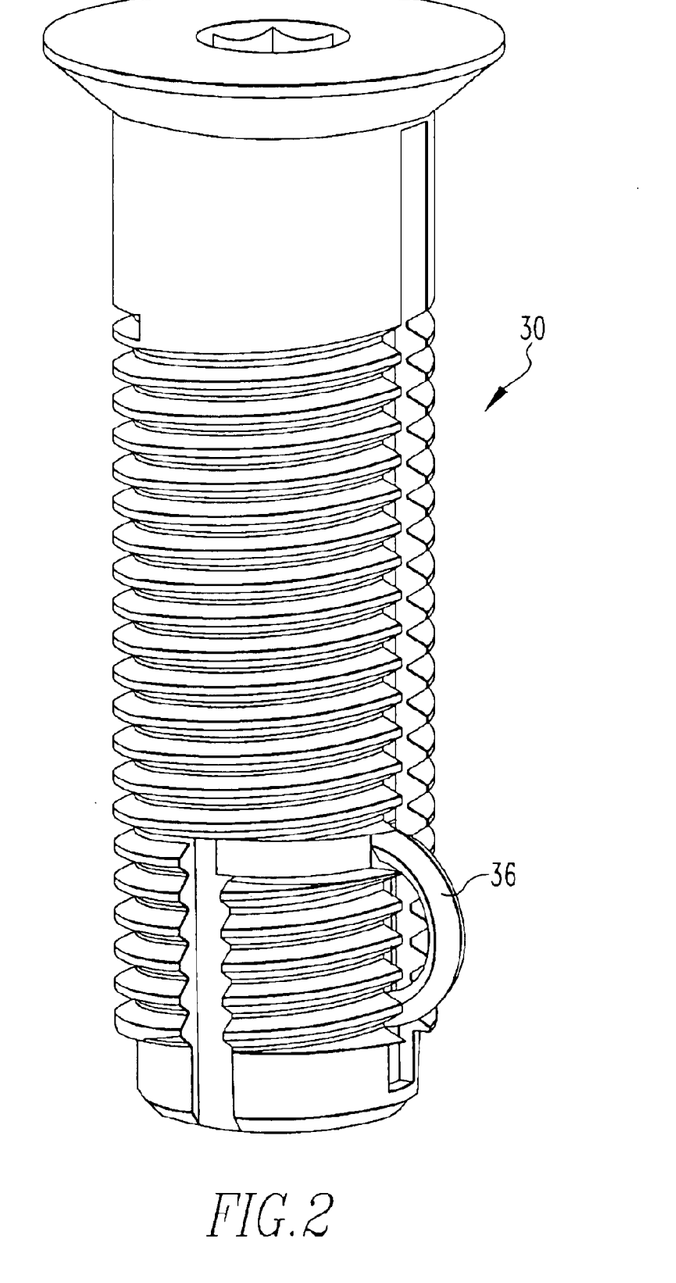
FIG. 2 is a perspective view of a typical bolt for receipt of the nut of FIG. 1.

FIG. 1 depicts the lock nut 20 as it appears in a free state, prior to the insertion of an externally threaded member or bolt 30, as shown in FIG. 2. It can be seen that the innermost portions of the beam sidewalls 27 and 28 are closely situated to adjacent beam sidewalls. As the bolt 30 is threaded onto the lock nut and secured therein, the beams deflect outwardly. Upon removal of the bolt, each of the beams returns to its free state by flexing inwardly.

The internal threaded surface 24 includes first and second angled radially-inwardly surfaces 32 and 34 positioned on the edges of the inner surface adjacent the side surfaces 27 and 28. The angled surfaces 32 and 34 are positioned on opposite sides of the slots between individual beams. Angled surfaces 32 and 34 define a substantially V-shaped internal slot which runs the full length of the beam and can optionally continue through the full length of the nut 20. Consequently, the internal threads at the junction of the slotted beams are angled radially inwardly. This V-shaped internal slot improves the cycle life or reusability performance of the nut because the cantilevered beam now approaches the characteristics of a true rectangular beam. A substantially rectangular beam distributes the bending load throughout the length of the beam more evenly, thus reducing stress concentrations.

The V-shaped internal slot also prevents the holdout spring 36 (FIG. 2) of bolt 30 from becoming wedged into the slots between individual beams. The V-shaped internal slot acts as a detent so as not to capture the spring. In addition, a secondary locking system is added to provide additional prevailing torque, which is accomplished during installation and removal of the holdout spring as it ratchets into the V-shaped slots between the beams. The additional friction generated contributes to increased prevailing torque.

Figure 3:
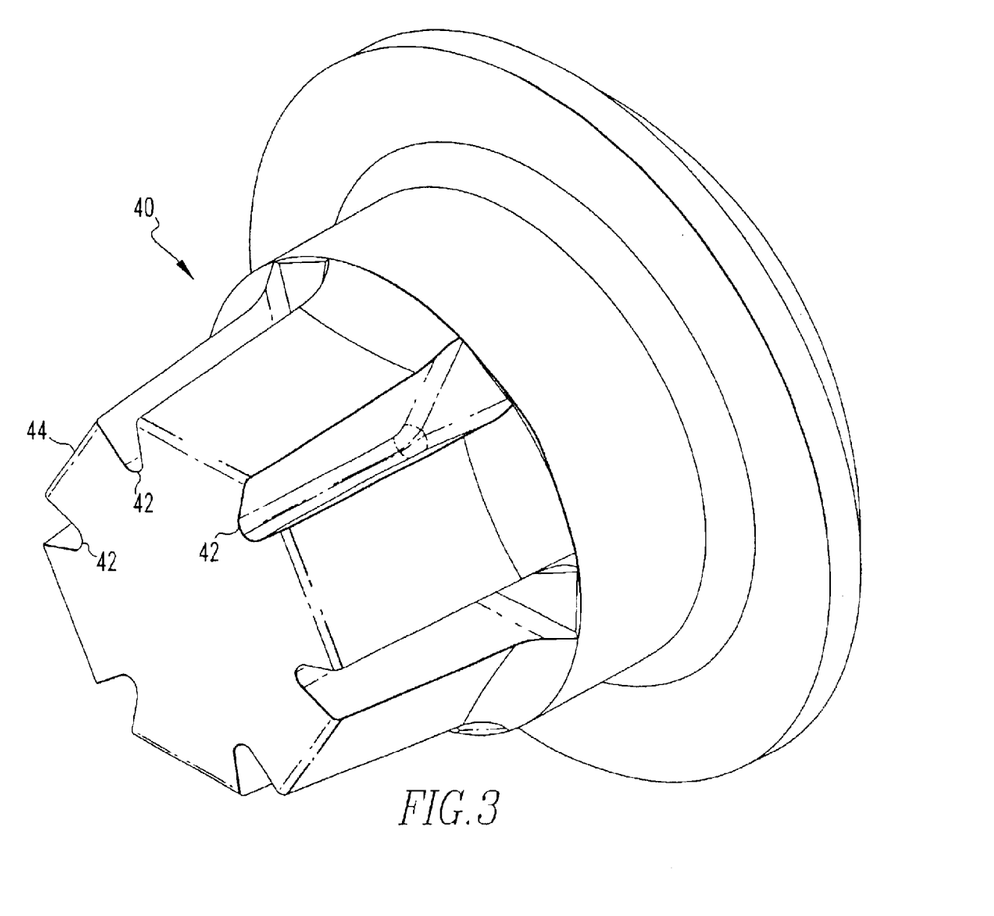
FIG. 3 is a perspective view of the heading operation of the nut of FIG. 1.
Figure 4A:
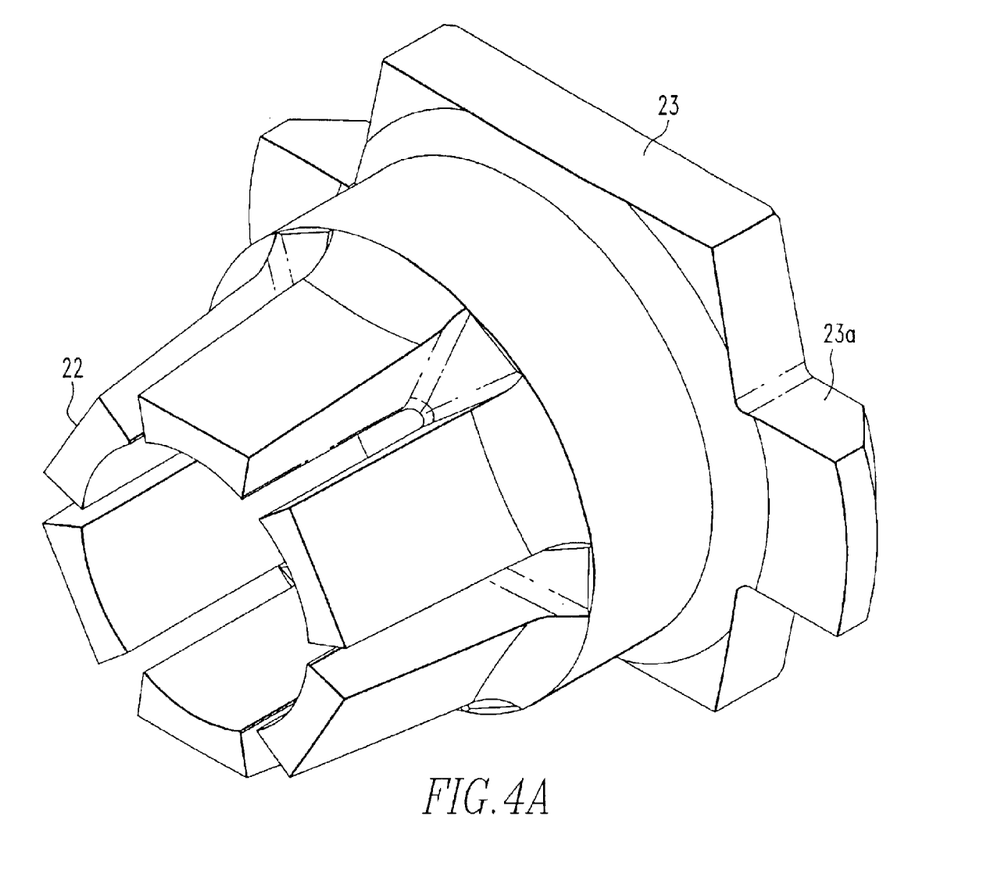
FIG. 4A is a perspective view of the nut blank of FIG. 3 after a drilling operation.
Figure 4B:
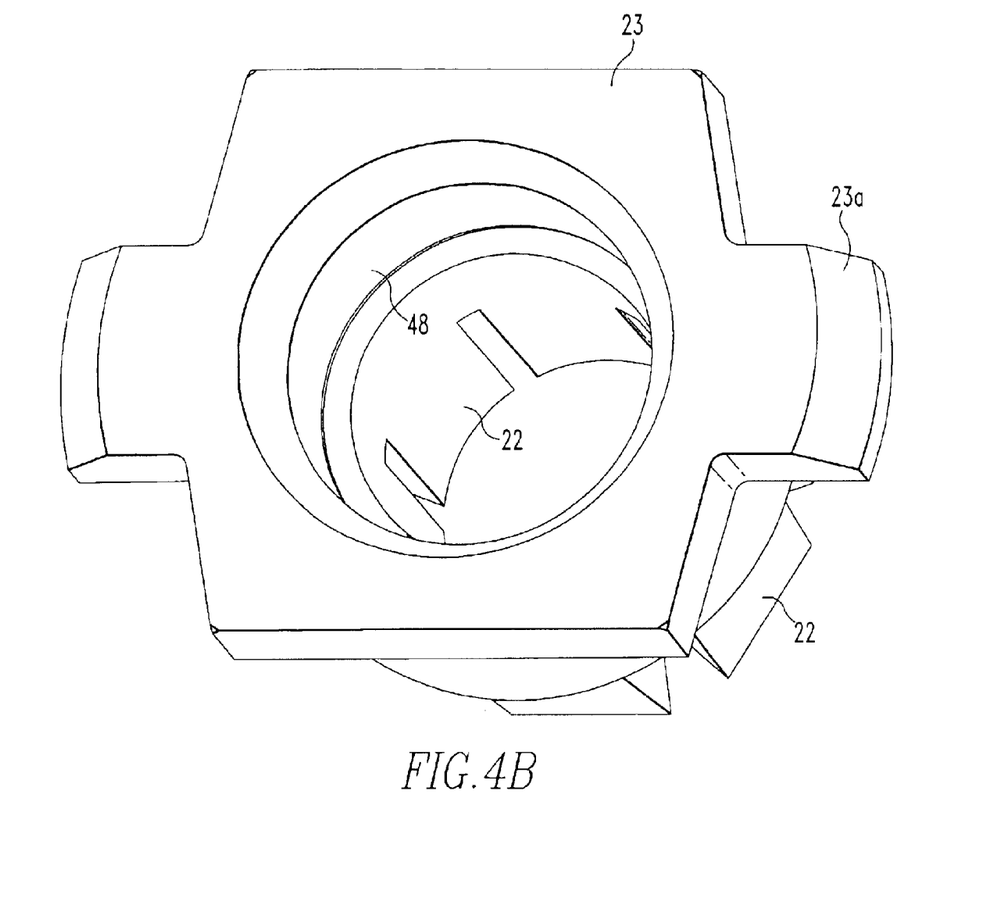
FIG. 4B is an opposite end perspective view of the nut of FIG. 4A.
Figure 4C:
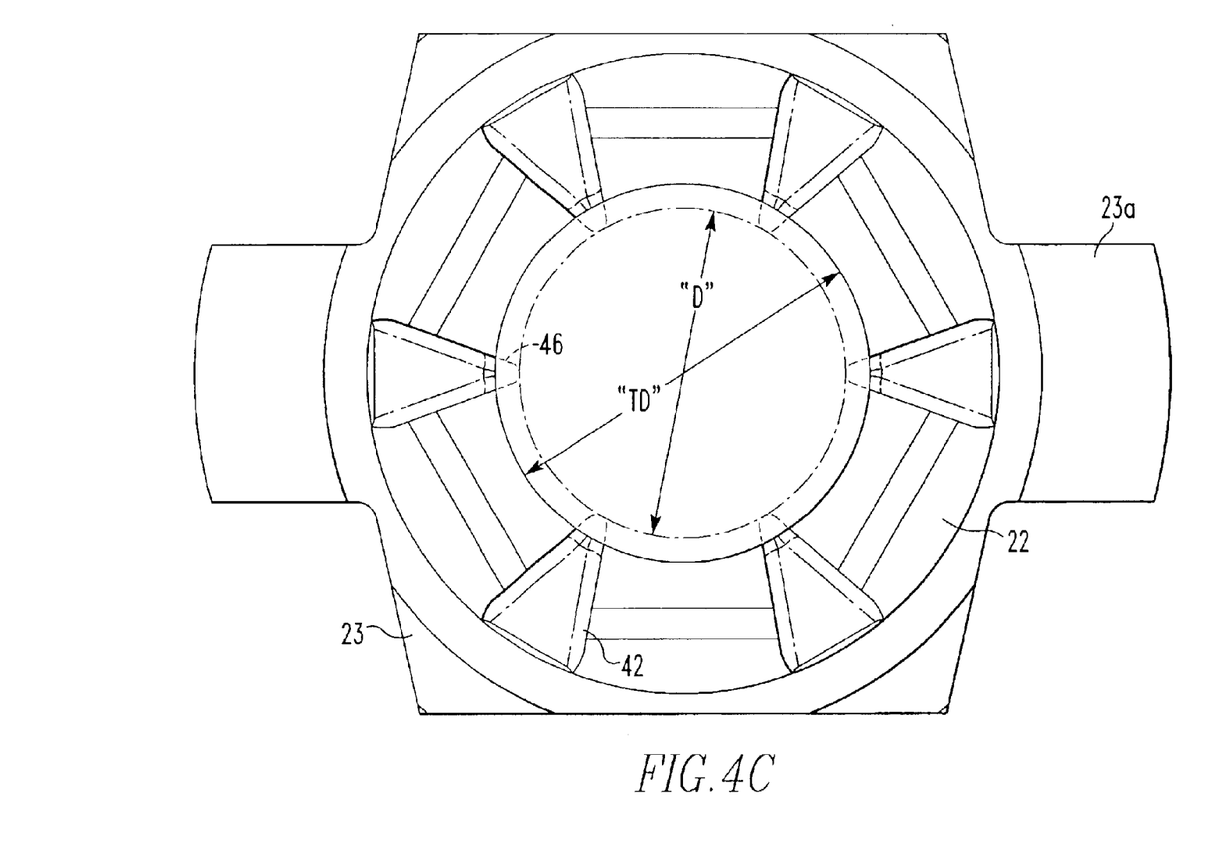
FIG. 4C is an end view of the nut of FIG. 4A.

The nut is easily fabricated wherein, as shown in FIG. 3, a heading procedure forms a plurality of V-shaped channels 42 extending from an exterior surface 44 of a nut blank 40 inwardly toward the axis of the nut blank. There are six V-shaped channels 42 shown, however more or less are contemplated by the invention. The depth of the external V-shaped channel 42 is greater than a subsequent tap drill diameter TD as shown in FIG. 4C. In other words, the diameter D extending between opposite V-shaped channels 42 is smaller than tap drill diameter TD. As shown in FIGS. 4A–C, a tap drilling operation removes the core of the nut blank and the apex 46 of the external V-shaped channel 42, thereby creating the individual beams 22. The flange 23 can also be trimmed to produce the positioners 23a. The tap drilling operation can also provide a counter bore 48 in the nut as necessary as shown FIG. 4B.

Figure 5A:
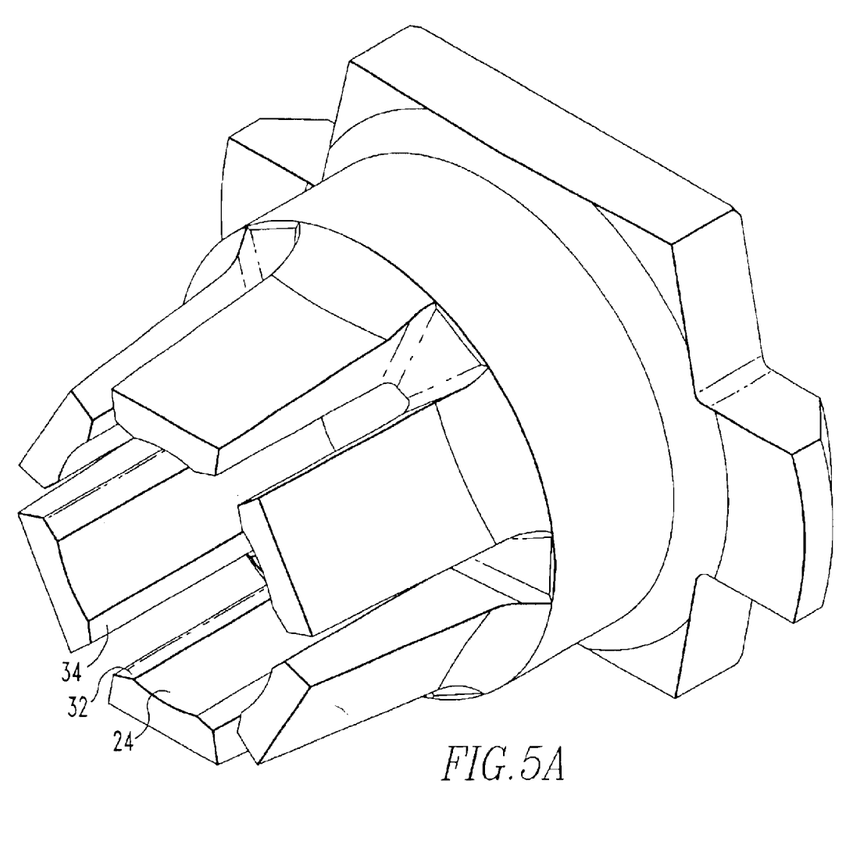
FIG. 5A is a perspective view of the nut of FIG. 4A after a broaching operation.
Figure 5B:
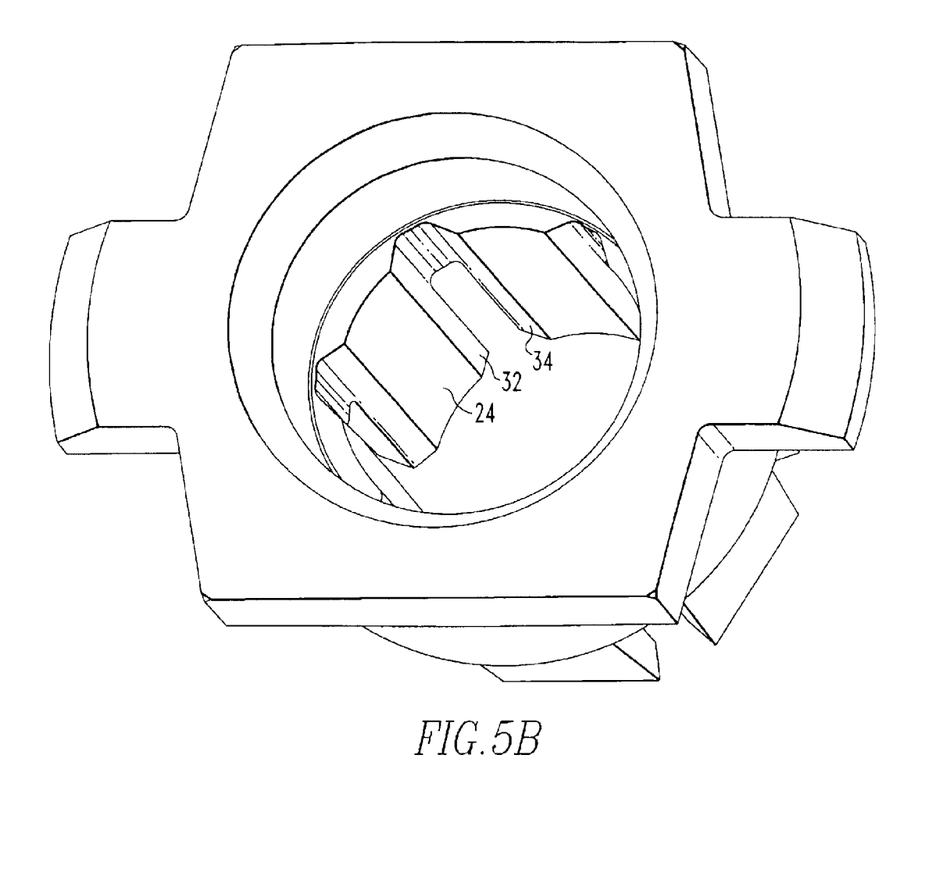
FIG. 5B is an opposite end perspective view of the nut of FIG. 5A.
Figure 5C:
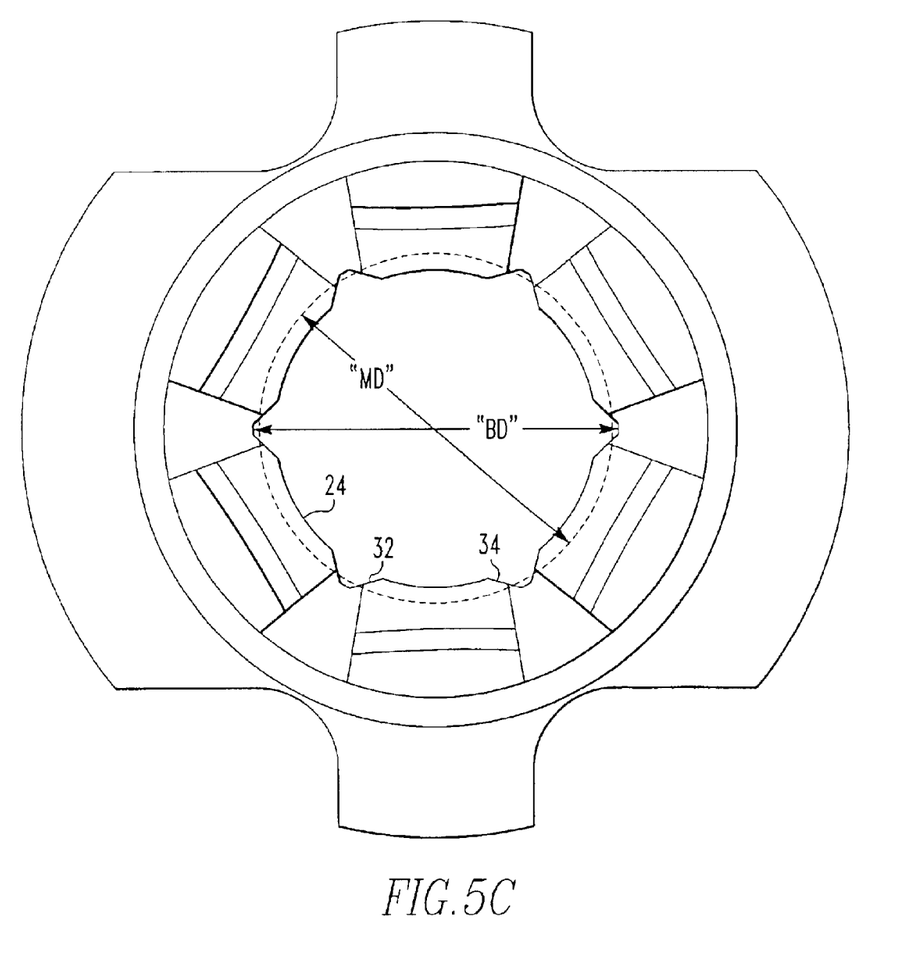
FIG. 5C is an end view of the nut of FIG. 5A.

As shown in FIGS. 5A–C, the internal surface 24 is then broached to produce angled surfaces 32 and 34, thus forming a V-shaped configuration for the slots between adjacent beams 22. As seen best in FIG. 5C, the depth of the broached surface is about the same as or slightly greater than a major diameter MD of threads 24a. In other words, broached diameter BD is about the same or slightly greater than major diameter MD. Finally, the inside surface 24 is tapped to provide the threads 24a and the beams are crimped to create a smaller diameter at the free end of the beams than at the opposite end of the beams adjacent the body portion 21.

Although the invention has been described in detail with respect to one embodiment thereof, one of ordinary skill in the art will appreciate that various modifications can be made without departing from the scope of the invention as hereinafter claimed.

What is claimed is:

1. A lock nut adapted to receive an externally threaded member comprising:

a substantially rigid body having a circular opening extending through the body; and a plurality of resilient, circumferentially-spaced locking beams integral with the rigid body and projecting outwardly from one end thereof, each of the locking beams has an inner surface that defines an opening aligned with the circular opening in the body, the locking beams tapering radially inwardly such that the opening defined thereby has a uniformly-decreasing diameter, wherein the aligned openings defined by the respective rigid body and plurality of locking beams contain threads for receiving the externally threaded member, the locking beams resiliently deflecting radially outward outwardly to lock the member in place, wherein the plurality of locking beams each have sidewalls arranged in spaced relationship with the sidewalls of circumferentially-adjacent locking beams, each sidewall being continuous, from the beam's inner, threaded surface to the beam's outer surface, wherein the inner surface of each locking beam has an angled surface along each edge extending radially inwardly to form a substantially V-shaped slot between each beam, and wherein the angled surface on the inner surface of the locking beams has a maximum diameter extending between opposite V-shaped slots which is about equal to or slightly greater than a major diameter of the threads.

2. The lock nut of claim 1 wherein the sidewalls of adjacent locking beams form a V-shaped channel between adjacent locking beams.

3. The lock nut of claim 2 wherein the V-shaped channel has an apex located in the opening defined by the inner surface of the locking beams, wherein the apex defines a diameter extending between opposite V-shaped channels which is less than a diameter of the inner surface of the locking beams.

4. The lock nut of claim 1 wherein the angled surface on the inner surface of the locking beams has a maximum diameter extending between opposite V-shaped slots which is about equal to a major diameter of the threads.

5. The lock nut of claim 1 wherein the plurality of locking beams include six equal-sized uniformly-spaced locking beams.

6. The lock nut of claim 1 wherein the plurality of locking beams are configured such that, when the lock nut receives the externally threaded member, the locking beams deflect substantially only radially outwardly to lock the member in place.

7. A locking beam nut adapted to receive an externally threaded member comprising:

a substantially rigid body having a circular opening extending therethrough; and a plurality of resilient, circumferentially-spaced substantially rectangular locking beams projecting from one end of the rigid body and having inner surfaces that cooperate to define an opening aligned with the circular opening in the body, the locking beams tapering radially inwardly such that the opening they define has a uniformly-decreasing diameter, and wherein the aligned openings defined by the respective rigid body and plurality of locking beams are threaded for receiving the externally threaded member, the locking beams resiliently deflecting radially outwardly to lock the member in place, wherein the inner surface of each locking beam has an angled edge portion extending radially inwardly to form a substantially V-shaped slot between each beam, and wherein the angled edge portion on the inner surface of the locking beams has a maximum diameter extending between opposite V-shaped slots which is about equal to or slightly greater than a major diameter of the threads.

8. The locking beam nut of claim 7 wherein the plurality of locking beams have a flat outer surface.

9. The locking beam nut of claim 7 wherein each locking beam has sidewalls, the sidewalls of adjacent locking beams form a V-shaped channel between adjacent locking beams.

10. The locking beam nut of claim 9 wherein the V-shaped channel has an apex located in the opening defined by the inner surface of the locking beams, wherein the apex defines a diameter extending between opposite V-shaped channels which is less than a diameter of the inner surface of the locking beams.

11. The locking beam nut of claim 7 wherein the aligned openings defined by the respective rigid body and plurality of locking beams together contain continuous threads that are uninterrupted along their entire axial length.

12. The locking beam nut of claim 7 wherein the plurality of locking beams are configured such that, when the locking beam nut receives the externally threaded member, the locking beams deflect substantially only radially outwardly to lock the member in place.

* * * * *